(12) United States Patent
Jeong et al.

(10) Patent No.: US 7,880,946 B2
(45) Date of Patent: Feb. 1, 2011

(54) METHOD OF IMPROVING QUALITY OF SIGNALS REPRODUCED FROM HOLOGRAPHIC STORAGE MEDIUM AND APPARATUS THEREFOR

(75) Inventors: Taek-soong Jeong, Suwon-si (KR); Jong-chul Choi, Suwon-si (KR); Moon-il Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 11/715,327

(22) Filed: Mar. 8, 2007

(65) Prior Publication Data

US 2008/0062489 A1    Mar. 13, 2008

(30) Foreign Application Priority Data

Sep. 8, 2006    (KR) .................... 10-2006-0086985

(51) Int. Cl.
G03H 1/22 (2006.01)
(52) U.S. Cl. .......................... 359/32; 382/254
(58) Field of Classification Search .............. None
See application file for complete search history.

(56) References Cited

U.S. PATENT DOCUMENTS 5,777,760 A    7/1998  Hays et al.
5,877,873 A    3/1999  Bashaw et al.
2006/0256414 A1*  11/2006  Baba .................... 359/22

FOREIGN PATENT DOCUMENTS

EP    1162520    12/2001
KR    2003-79035    10/2003

OTHER PUBLICATIONS

International Search Report issued in corresponding International Application No. PCT/KR2007/003878 Nov. 19, 2007.

* cited by examiner

*Primary Examiner*—Stephone B Allen
*Assistant Examiner*—Derek S Chapel
(74) *Attorney, Agent, or Firm*—NSIP Law

(57) ABSTRACT

A method and apparatus for improving quality of a signal reproduced from a holographic storage medium in which a hologram is recorded by interference between a signal beam and a reference beam. The signal-quality improving method includes determining a page crosstalk value, which is caused in a page that is to be reproduced from the holographic storage medium by an adjacent page to the page that is to be reproduced, on the basis of on-pixel crosstalk values caused by a plurality of on-pixels of the adjacent page; and removing the determined page crosstalk value from a reproduced signal of the page that is to be reproduced. Since an interpage crosstalk that occurs when multiplexing recording in the holographic storage medium is calculated, and is removed from a reproduced signal, the quality of the reproduced signal can be improved.

2 Claims, 16 Drawing Sheets

(a)  (b)

RECORDING

REPRODUCTION $$\eta \propto \operatorname{sinc}^2\left(\frac{L(\vec{K}_R' + \vec{K} - \vec{K}_S') \cdot \hat{z}}{2\pi}\right)$$

BEFORE CROSSTALK REMOVAL

AFTER CROSSTALK REMOVAL

METHOD OF IMPROVING QUALITY OF SIGNALS REPRODUCED FROM HOLOGRAPHIC STORAGE MEDIUM AND APPARATUS THEREFOR

CROSS-REFERENCE TO RELATED APPLICATIONS

This application claims all benefits accruing under 35 U.S.C. §119 from Korean Patent Application No. 2006-86985, filed on Sep. 8, 2006 in the Korean Intellectual Property Office, the disclosure of which is incorporated herein by reference.

BACKGROUND OF THE INVENTION

1. Field of the Invention

Aspects of the present invention relate to a holographic storage medium and, more particularly, to an apparatus and method of reducing interpage reproduction crosstalk noise in a holographic storage medium.

2. Related Art

In optical holography, data is stored in the volume of a recording medium instead of on the surface of the recording medium. A beam incorporating a data signal interferes with a reference beam, producing interference gratings (called data pages) inside the recording medium. The gratings overlap each other by changing optical characteristics of the reference beam through a process called multiplexing. To read data from the recording medium, a single reference beam illuminates the recording medium under the same conditions as those used for data recording, generating a diffraction beam representing a stored data page. The diffraction beam is detected by a detection array, which extracts a stored data bit from a measured intensity pattern. Each of the stored data pages contains a plurality of data bits or pixels. Overlapping the data pages in the same volume may increase the recording medium's storage capacity.

A hologram is recorded using both a signal beam and a reference beam. As shown in FIG. 1, during recording, a reference beam R and a signal beam S interfere with each other to generate an interference pattern. The interference pattern is transmitted to a medium. During reproduction, the original reference beam R that was applied for recording illuminates the hologram recorded in the medium, causing diffraction in the recorded hologram and producing an output signal beam S. Hence, if the reference beam for reproduction differs from the reference beam for recording, the reproduced beam also differs from an initially recorded beam in intensity and direction. Conventionally, as the difference in intensity and direction between the reproduced beam and the initially recorded beam increases, the intensity decreases in the form of a sinc function.

FIGS. 2A and 2B are views illustrating a grating recorded by a pair of plane waves, and an angular change of a reproduced beam and a decrease in diffraction efficiency that occurs since a reference beam for reproduction does not satisfy a certain condition. In FIGS. 2A and 2B, $\vec{K}_S$ and $\vec{K}_R$ are wave vectors of a signal beam and a reference beam, respectively, and $\vec{K}$ is the vector of the grating formed by interference between the signal and reference beams. L denotes the thickness of a medium and $\hat{z}$ denotes a unit vector in a direction perpendicular to the medium. In FIG. 2B, a dotted line denotes a recording beam and a solid line denotes a reproduction beam. Conventionally, as shown in the equation of FIG. 2B, the diffraction efficiency ($\eta$) decreases, as each of the wave vectors of the signal beam and the reference beam does not satisfy Bragg conditions. The Bragg conditions indicate that high diffraction efficiency is provided when holograms recorded with a specific reference beam are reproduced with the same reference beam. When the wave vector of the reference beam used for reading differs substantially from that of the reference beam for recording, the diffraction efficiency decreases significantly. The wave vector of the reference beam for reading may be changed by changing an incident angle or wavelength of the reference beam.

Due to this phenomenon, a holographic storage medium records signals of several overlapping data pages in the same volume of the medium. When recording overlapping signals, the reference beam is different for each of the overlapping data pages. Overlapping data pages are reproduced with varying intensity depending on the reproducing reference beams incident on the holographic storage medium. Therefore, the reproduced data pages can be distinguished from each other by modulating the condition of the reference beam. However, in actual application, it is difficult to separate the data pages from each other perfectly using the different reference beams used to record the respective data pages. Particularly, in order to increase recording capacity, the interval of the reference beams used for recording is small. For this reason, in actual reproduction, both a first data page and a second data page recorded under close conditions are reproduced, thereby causing crosstalk (noise) and reduced signal quality.

To reduce crosstalk, the conventional art has only addressed the issue of crosstalk from an optical point of view in terms of how the difference between reference beams can be maximized. Thus, a method of maintaining the maximum difference between reference beams corresponding to respective data pages has been employed.

That is, an optical method has been used to simply widen an interval between data pages when multiplexing recording and reduce crosstalk only in units of a page group consisting of a plurality of recorded data pages. However, when sufficient intervals between the plurality of recorded pages of the page are not ensured, signal quality greatly deteriorates due to crosstalk. For example, in the conventional optical methods widening the intervals of the data pages has been considered to be sufficient because the recording capacity is not large. However, a method of removing crosstalk more efficiently is being demanded in order to increase the recording capacity in the future.

SUMMARY OF THE INVENTION

Aspects of the present invention provide an apparatus and method for improving quality of reproduced signals by obtaining an interpage crosstalk value occurring in a holography storage medium when multiplexing recording, and removing the interpage crosstalk value from the reproduced signals.

Additional aspects and/or advantages of the invention will be set forth in part in the description which follows and, in part, will be obvious from the description, or may be learned by practice of the invention.

According to an aspect of the present invention, there is provided a method of improving quality of a signal reproduced from a holographic storage medium in which a hologram is recorded by interference between a signal beam and a reference beam, the method including determining a page crosstalk value caused by an adjacent page to the page that is to be reproduced on the basis of on-pixel crosstalk values caused by a plurality of on-pixels of the adjacent page; and removing the determined page crosstalk value from a reproduced signal of the page to be reproduced.

According to another aspect of the present invention, the determining of the page crosstalk value caused by the adjacent page may include determining the page crosstalk value by considering on-pixel crosstalk values caused by all the on-pixels included in the adjacent page.

According to another aspect of the present invention, the on-pixel crosstalk values may be obtained through a simulation, an experiment, or an equation.

According to another aspect of the present invention, the on-pixel crosstalk values may be stored in a reproduction device of the holographic storage medium in advance.

According to another aspect of the present invention, the adjacent page may be at least one of a page preceding and a page following the page to be reproduced.

According to another aspect of the present invention, the on-pixel crosstalk values may be applied to all pixels in a region including a plurality of pixels.

According to another aspect of the present invention, when the adjacent page is a page that is initially reproduced, the method may further include determining a page crosstalk value caused by the page to be reproduced on the basis of on-pixel crosstalk values caused by a plurality of on-pixels included in the page to be reproduced; removing the page crosstalk value caused by the page to be reproduced from a reproduced signal of the adjacent page; and further removing a page crosstalk from the page to be reproduced using the adjacent page from which the page crosstalk value caused by the page to be reproduced has been removed.

According to another aspect of the present invention, there is provided a method of obtaining a crosstalk value to reduce crosstalk of a reproduced signal in a holographic storage medium in which a pattern created by interference between a signal beam and a reference beam is recorded in a hologram, the method including recording a reference page having a predetermined pattern in the holographic storage medium; reproducing the recorded reference page at a reproduction angle at which a page adjacent to the reference page is reproduced; and obtaining a pixel crosstalk value of each pixel included in the reference page from the reproduced reference page.

According to still another aspect of the present invention, there is provided an apparatus to improve quality of a signal reproduced from a holographic storage medium in which a hologram is recorded by interference between a signal beam and a reference beam, the apparatus including a crosstalk determining unit to determine a page crosstalk value caused by an adjacent page to a page to be reproduced from the holographic storage medium on the basis of on-pixel crosstalk values caused by a plurality of on-pixels included in the adjacent page; and a crosstalk removing unit to remove the page crosstalk determined by the crosstalk determining unit from a reproduced signal of the page to be reproduced.

According to even another aspect of the present invention, there is provided a recording or reproduction apparatus to record data in a holographic storage medium in which a hologram is recorded by interference between a signal beam and a reference beam, or reproducing data from the medium, the apparatus including an optical processor to record data in the holographic storage medium or to reproduce data from the holographic storage medium; and a controller to control the optical processor to reproduce a page that from the holographic storage medium and an adjacent page, and to perform data processing on the reproduced page and the adjacent page. The controller may determine a page crosstalk value caused by the adjacent page on the basis of on-pixel crosstalk values caused by a plurality of on-pixels included in the adjacent page and may remove the determined page crosstalk value from the reproduced page.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
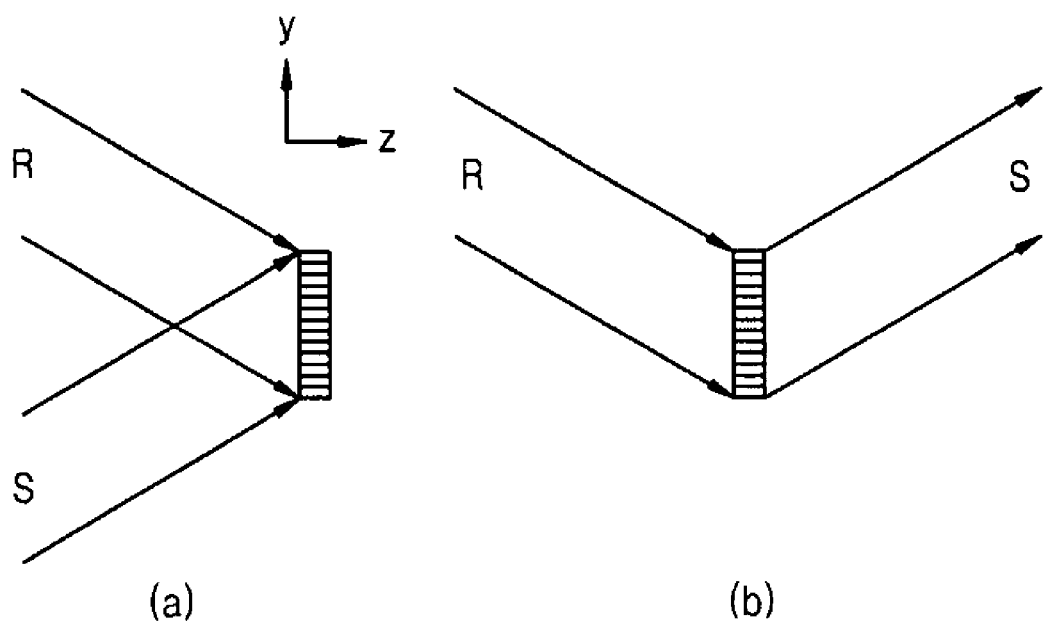
FIG. 1 is a reference view describing recording and reproduction in optical holography.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
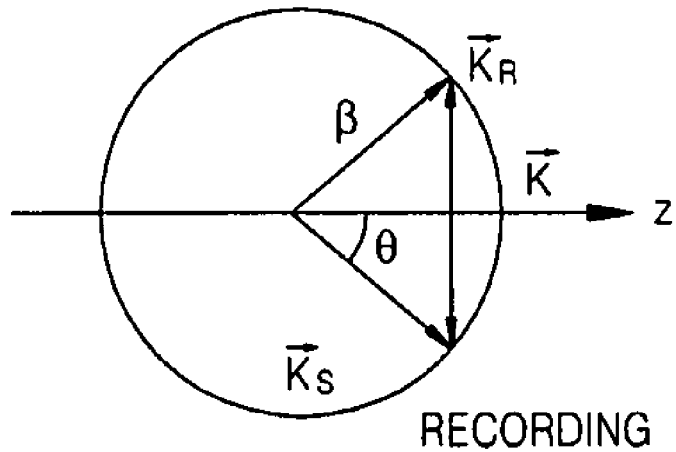
FIGS. 2A and 2B are reference views describing an angular change of a reproduced beam and a diffraction effect in optical holography.
Figure 2B:
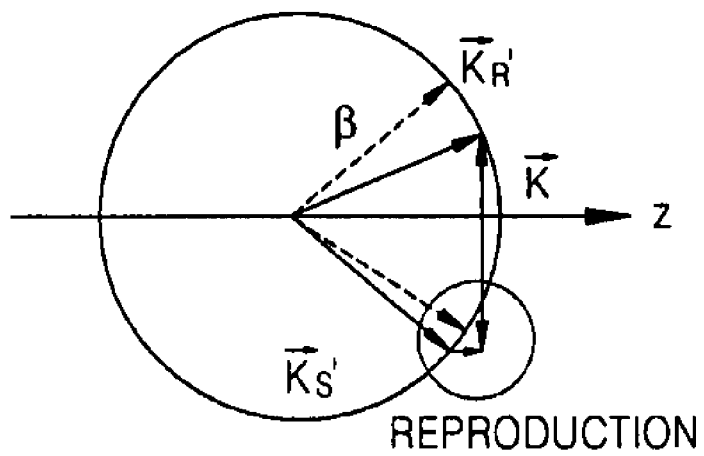

Aspects of the present invention provide a technique for improving signal quality by calculating a page crosstalk value caused by an adjacent page and removing the calculated page crosstalk value from a reproduced image. Conventionally, in the case of holographic recording and reproduction with a plane wave as shown in FIGS. 2A and 2B, it is easy to calculate a change in a reproduced beam caused by a change in a reference beam during reproducing. However, in actuality, holographic storage medium data in one page is not formed with a simple plane wave but with very complex waves, making it difficult to calculate a page crosstalk value caused by an adjacent page.

Figure 3:
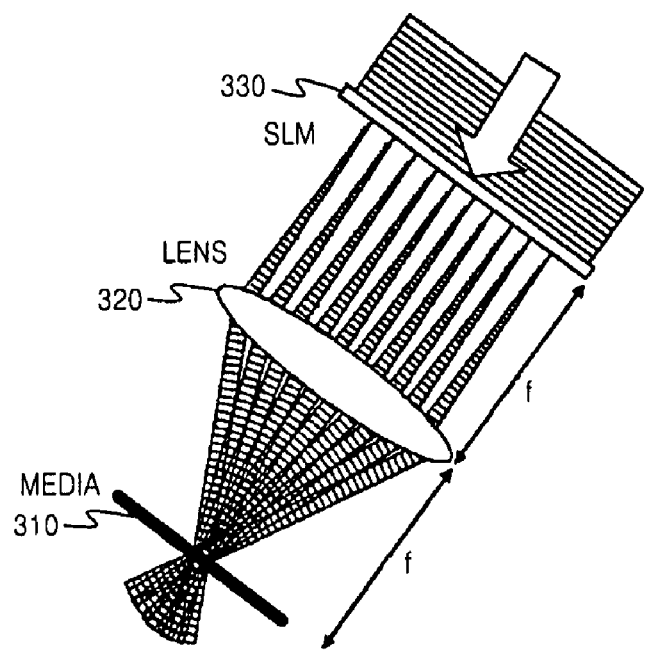
FIG. 3 is a reference view describing formation of a signal beam for data recording in optical holography, according to an example embodiment of the present invention.

FIG. 3 is a reference view describing formation of a signal beam for data recording in optical holography, according to an example embodiment of the present invention. For a widely used spatial light modulator (SLM) 330 having a pixel size as small as 10 μm, a signal generated from each pixel may approximate a point light source. As shown in FIG. 3, signal beams emitted from respective point light sources become a plurality of plane waves all having different angles as those signal beams pass through a lens 320. Accordingly, a signal beam on a holographic storage medium may be considered a combination of the plurality of plane waves corresponding to the number of pixels of the SLM 330. That is, for each of the pixels, a plane wave may be considered to interfere with a reference beam.

Accordingly, a page crosstalk value caused by a page of the SLM 330 may be a combination of pixel crosstalk values caused by individual pixels of the page of the SLM 330. If pixel crosstalk values with respect to all pixel locations have already been calculated, the page crosstalk value with respect to one page having specific data can be obtained as a combination of the pixel crosstalk values with respect to on-pixels (pixels turned on) transmitted from the SLM 30. In such a manner, on-pixels crosstalk values on the page can be obtained and the quality of a reproduced signal can be improved by removing from the signal the obtained on-pixels crosstalk values.

Figure 4:
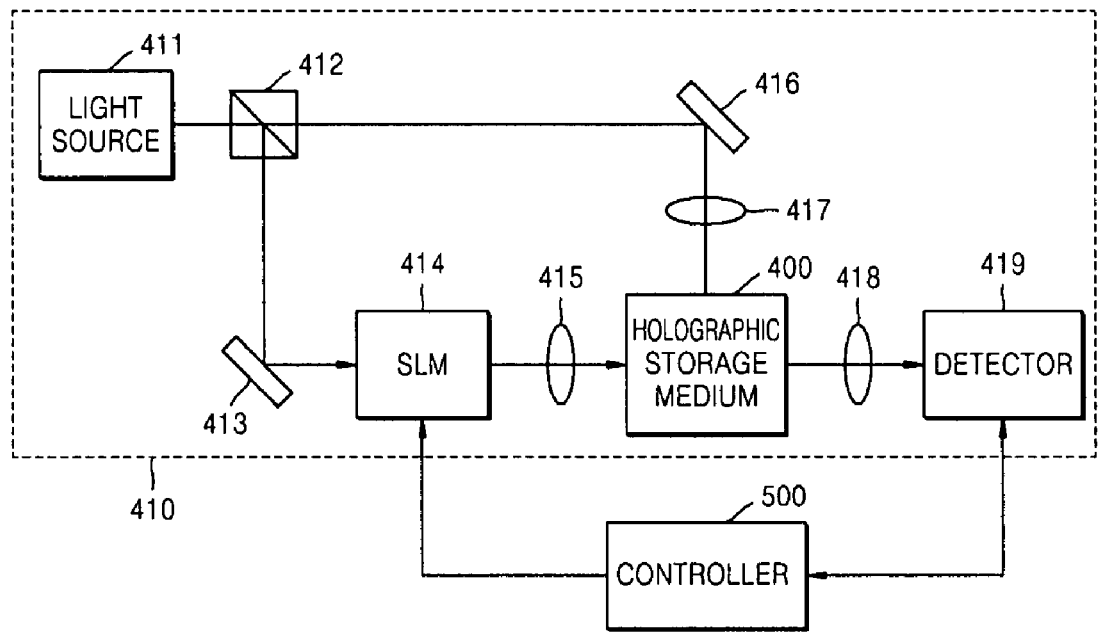
FIG. 4 is a block diagram of a holographic recording and reproduction apparatus according to an example embodiment of the present invention.

FIG. 4 is a block diagram of a holographic recording and reproduction apparatus according to an example embodiment of the present invention. The holographic recording and reproduction apparatus includes an optical processor 410 including a holographic storage medium 400 and a controller 500 arranged to control the optical processor 410 to record data in the holographic storage medium 400 or to reproduce data from the holographic storage medium 400. The optical processor 410 further includes a laser light source 411, a beam splitter 412, a first mirror 413, a spatial light modulator (SLM) 414, a first lens 415, a second mirror 416, a second lens 417, a third lens 418, and a detector 419. According to other aspects of the present invention, the holographic recording and reproduction apparatus may contain other components. In addition, the functionality of one or more components may be combined into a single component.

The controller 500 controls an optical processor 410, generates a data page including recording data so as to transmit the data page to the optical processor 410, and performs data processing on a signal reproduced by the optical processor 410. In order to remove interpage crosstalk, the controller 500 may determine a page crosstalk value in a page to be reproduced caused by a page adjacent page to the page to be reproduced and may remove the determined page crosstalk value from a reproduced signal of the page to be reproduced.

When data is recorded in the holographic storage medium 400, a coherent laser beam output from a laser light source 411 is incident on a beam-splitter 412 and is divided into a reference beam and a signal beam. The signal beam is directed to the spatial light modulator 414. In the spatial light modulator 414, the signal beam representing recording data experiences spatial light modulation (amplitude modulation). The modulated signal beam is focused on the holographic storage medium 400 by the first lens 415. The reference beam is reflected by the second mirror 416 so as to be directed onto the holographic storage medium 400 via the second lens 417. Thus, interference fringes formed by superposition of the signal beam and the reference beam are recorded in the holographic storage medium 400 as fine dense patterns.

In order to reproduce data recorded in the holographic storage medium 400, the same illumination beam as the reference beam used to record the data page to be reproduced illuminates the holographic storage medium 400. Data is reproduced as diffraction beams corresponding to the interference fringes recorded in the holographic storage medium 400. The third lens 418 focuses the diffraction beams on the detector 419, which may be configured as a charge-coupled device (CCD), a complimentary metal-oxide-semiconductor (CMOS), or another type of detector. A reproduced signal output from the detector 419 is transmitted to the controller 500.

Figure 5:
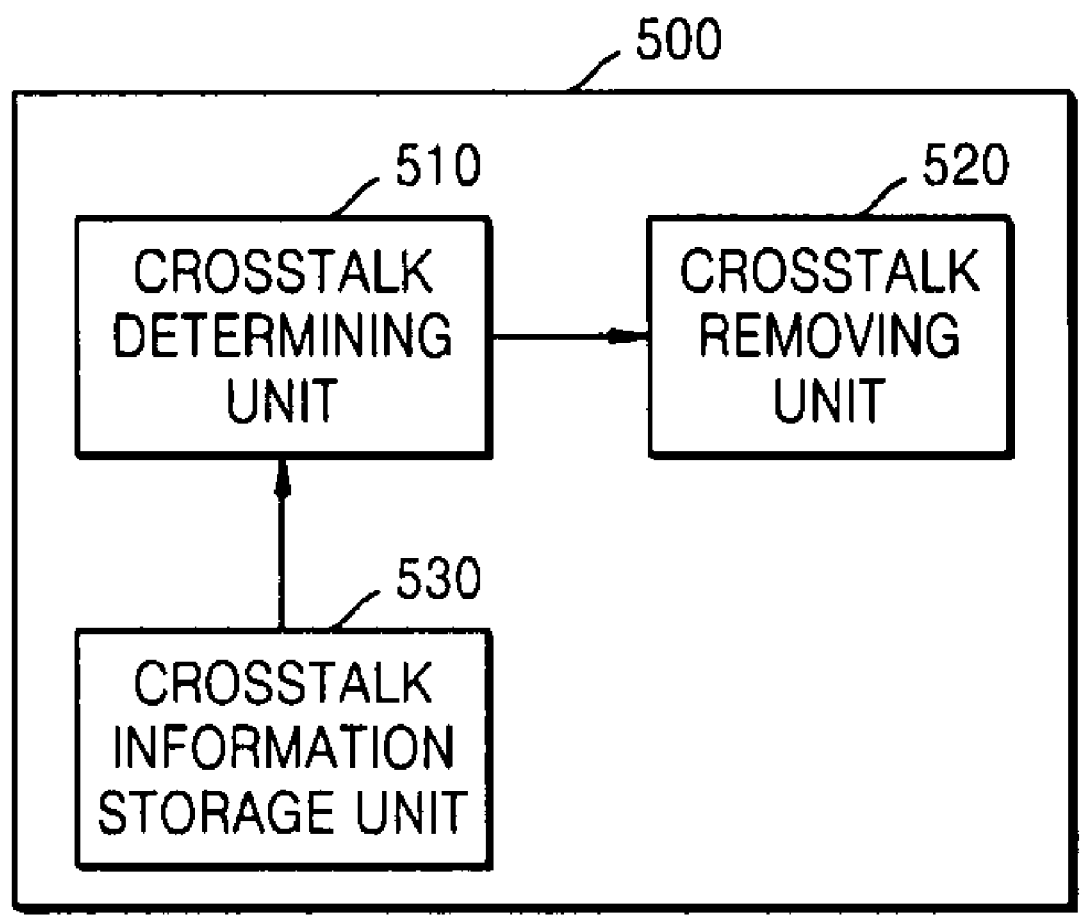
FIG. 5 is a detailed block diagram of a controller of the recording and reproduction apparatus shown in FIG. 4, according to an example embodiment of the present invention.

FIG. 5 is a detailed block diagram of the controller 500 of the holographic recording and reproduction apparatus 400 of FIG. 4, according to an example embodiment of the present invention. As shown in FIG. 5, the controller 500 of the holographic recording and reproduction apparatus 400 includes a crosstalk determining unit 510, a crosstalk removing unit 520, and a crosstalk information storage unit 530.

The crosstalk information storage unit 530 stores crosstalk information for individual pixels of a page in advance or stores equation information necessary to calculate the crosstalk information for the individual pixels. The crosstalk values of the individual pixels may be obtained by a simulation or an experiment. In order to obtain pixel crosstalk values, the crosstalk values for all the individual pixels may be obtained as mentioned above. Alternately, one page may be divided into regions each including a plurality of pixels and crosstalk values may be obtained for each of the regions. Specifically, identical crosstalk values are set for pixels in one region, so that an experiment or a computation can be simplified when the crosstalk information is calculated and the capacity for storing the crosstalk information can be saved.

The crosstalk determining unit 510 determines a page crosstalk value in the page to be reproduced from the holographic storage medium 400, which is caused by a page adjacent to the page to be reproduced, on the basis of on-pixel crosstalk values caused by a plurality of on-pixels of the adjacent page. The crosstalk determining unit 510 may determine the page crosstalk value caused by the adjacent page by considering all the on-pixel crosstalk values of the adjacent page. The adjacent page may be at least one of a preceding page and a following page with reference to the page to be reproduced. The crosstalk removing unit 520 removes the page crosstalk value determined by the crosstalk determining unit 510 from a reproduced signal of the page that is to be reproduced.

In addition, where the adjacent page is a page that is initially reproduced, the crosstalk determining unit 510 further determines a page crosstalk value caused in the adjacent page by the page to be reproduced on the basis of on-pixel crosstalk values caused by a plurality of on-pixels of the page to be reproduced.

The crosstalk removing unit 520 removes the page crosstalk values caused by the page to be reproduced from the reproduced signal of the adjacent page and removes a crosstalk value from the reproduced signal of the page to be reproduced using the adjacent page from which the crosstalk value has been removed. Consequently, crosstalk can be removed more precisely from the page that is to be reproduced.

Figure 6A:
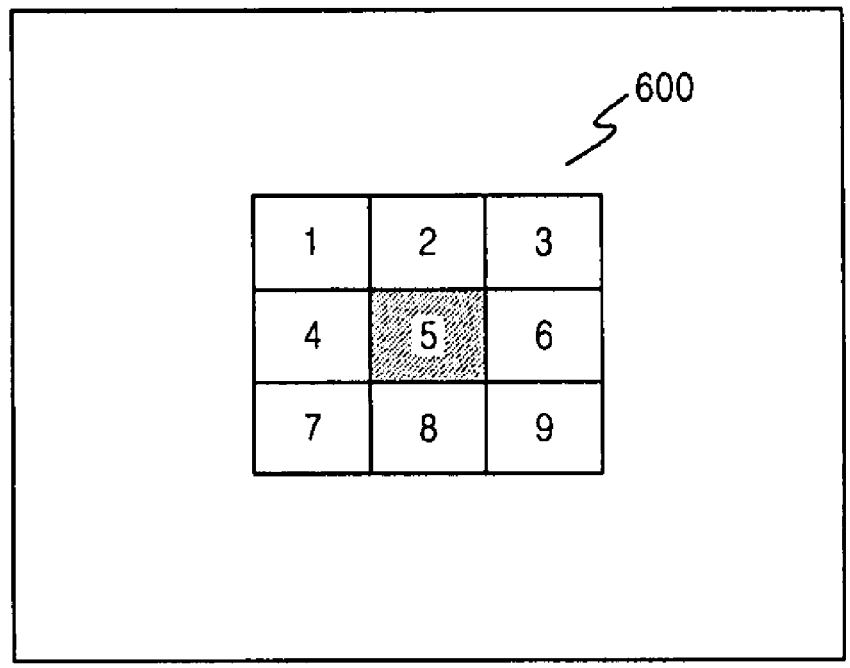
FIG. 6A is a view showing a state when a pixel 5 of a data page is recorded and FIG. 6B is a view showing pixel crosstalk caused by the recorded pixel 5 in the data page of FIG. 6A, according to example embodiments of the present invention.

FIGS. 6A though 10B are views of a page having 3×3 pixels. FIGS. 6A through 10B are a simulation where a first page is recorded at a first angle, a second page is recorded at a second angle at an angular selectivity interval from the first page, and page crosstalk with respect to the first page is calculated when the second page is reproduced.

Figure 6B:
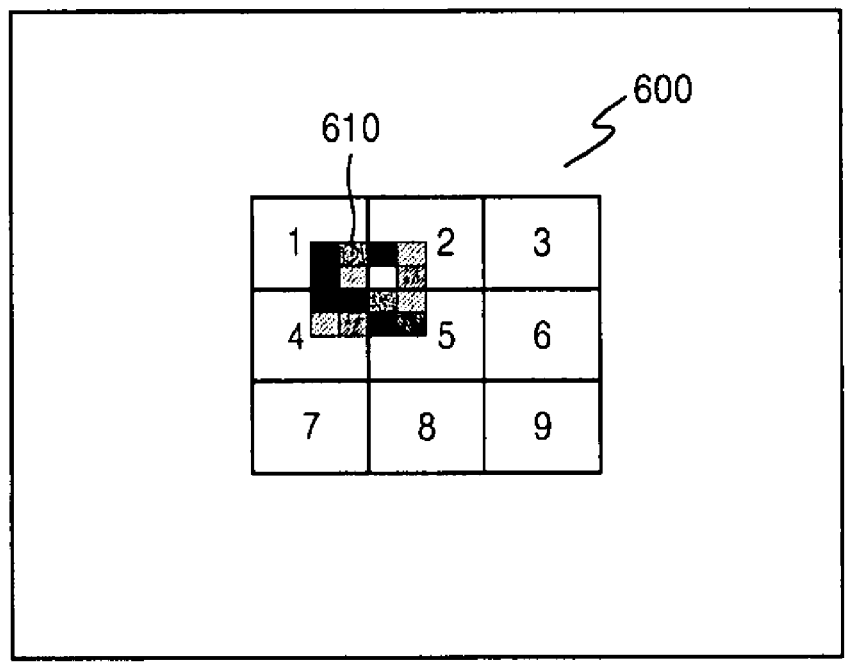
Figure 7A:
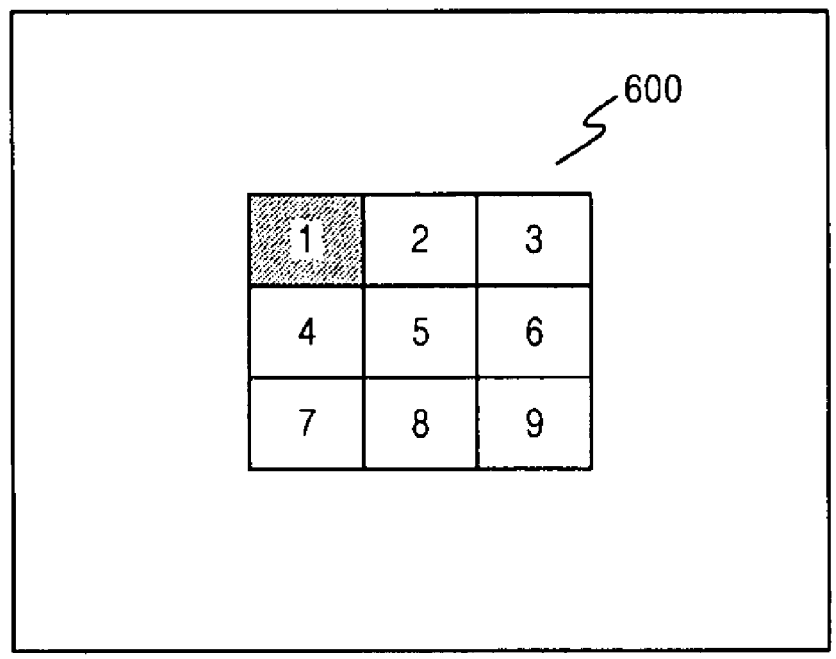
FIG. 7A is a view showing a state when a pixel 1 of a data page is recorded and FIG. 7B is a view showing pixel crosstalk caused by the recorded pixel 1 in the data page of FIG. 7B, according to example embodiments of the present invention.
Figure 7B:
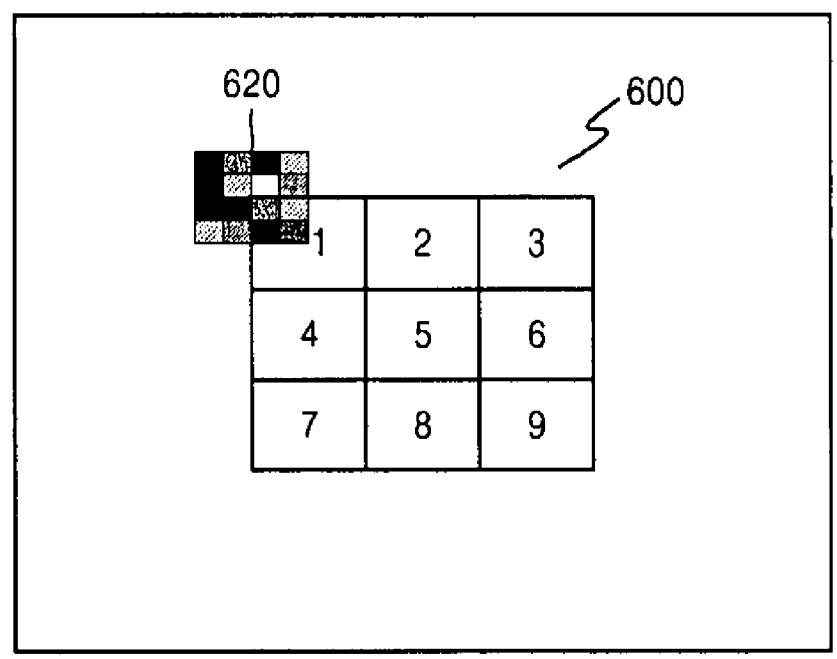

First, pixel crosstalk values caused by individual pixels of the data are calculated and are stored as information. FIG. 6A is a view showing a state when a pixel 5 at a 2×2 location in a data page 600 having 3×3 pixels is recorded at the first angle according to an example embodiment of the invention. FIG. 6B is a view showing first crosstalk 610 occurring when the recorded pixel 5 at the 2×2 location in the data page 600 is reproduced at the second angle according to an example embodiment of the present invention. First crosstalk 610 occurs slightly at a left upper side from the 2×2 location of the pixel 5. FIG. 7A is a view showing a state when a pixel 1 at a 1×1 location in the data page 600 having 3×3 pixels is recorded at the first angle according to an example embodiment of the invention. FIG. 7B is a view showing second crosstalk 620 occurring when the recorded pixel 1 in the data page 600 is reproduced at the second angle according to embodiments of the present invention. Second crosstalk 620 occurs slightly at a left upper side from the 1×1 location of the pixel 1. This process is performed with respect to all the 3×3 pixels of the page 600, thereby obtaining crosstalk information of all the 3×3 pixels. The crosstalk information of all the 3×3 pixels of the page 600 may be obtained through the simulation as described above or may be calculated experimentally. Alternatively, equations may be obtained and stored in a system in advance, so that necessary values can be obtained through calculations during reproduction. The crosstalk information obtained with respect to every pixel of one page may be stored as data.

A technique for obtaining crosstalk information through an equation will now be briefly described. As mentioned above, a signal beam for each pixel may approximate a plane wave. An angle of the signal beam may be obtained using a location of each corresponding pixel, and an angle of a reference beam is determined in advance. Accordingly, the size and direction of crosstalk with respect to each pixel may be obtained from the equation illustrated in FIG. 2B, which relates to a plane wave.

Figure 8A:
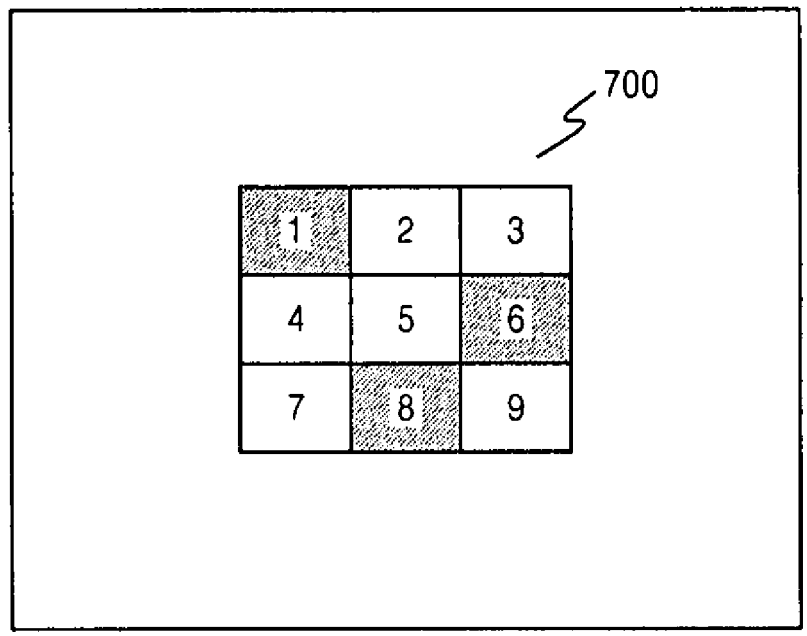
FIGS. 8A and 8B are views of a first page and a second page used in a simulation for removing crosstalk, according to example embodiments of the present invention.
Figure 8B:
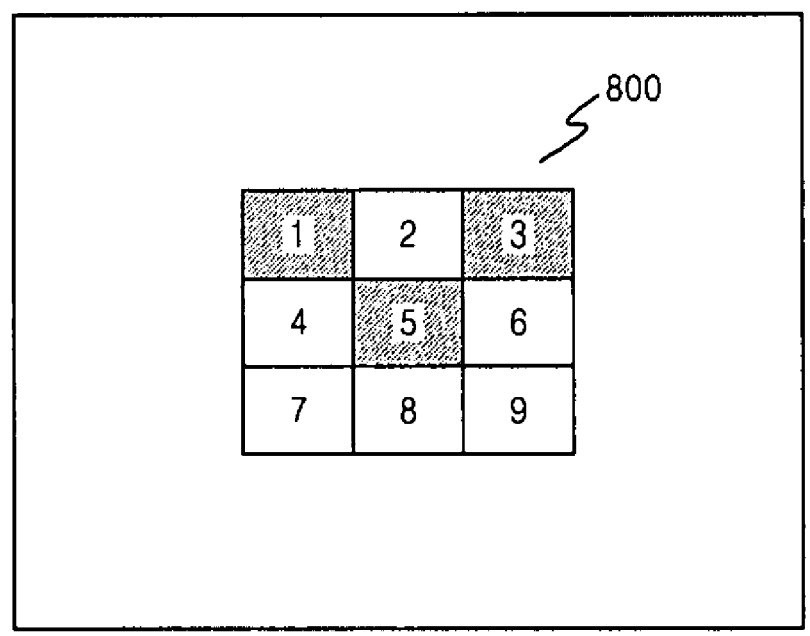

FIGS. 8A and 8B are views of a first page 700 and a second page 800 used in a simulation for removing crosstalk, according to example embodiments of the present invention. The first page 700 of FIG. 8A and the second page 800 of FIG. 8B are successively recorded and are reproduced. A reproduced signal from the second page 800 may be a combination of information of the second page and page crosstalk caused by the first page 700.

Page information is obtained through reproduction of the first page 700. Of course, since the page information of the first page 700 may have low signal quality, the signal quality must be improved through repetitive crosstalk removing operations. However, information that has been already known may be used. In the recorded first page 700, a pixel 1 at a 1×1 location, a pixel 6 at a 2×3 location, and a pixel 8 at a 3×2 location are on-pixels. Pixel crosstalk values caused by the on-pixels may be obtained by a combination of known pixel crosstalk values caused by the individual pixels. The crosstalk value caused by the first page 700 and calculated in the aforementioned manner is removed from a reproduced signal of the second page 800, thereby increasing signal quality.

Figure 9A:
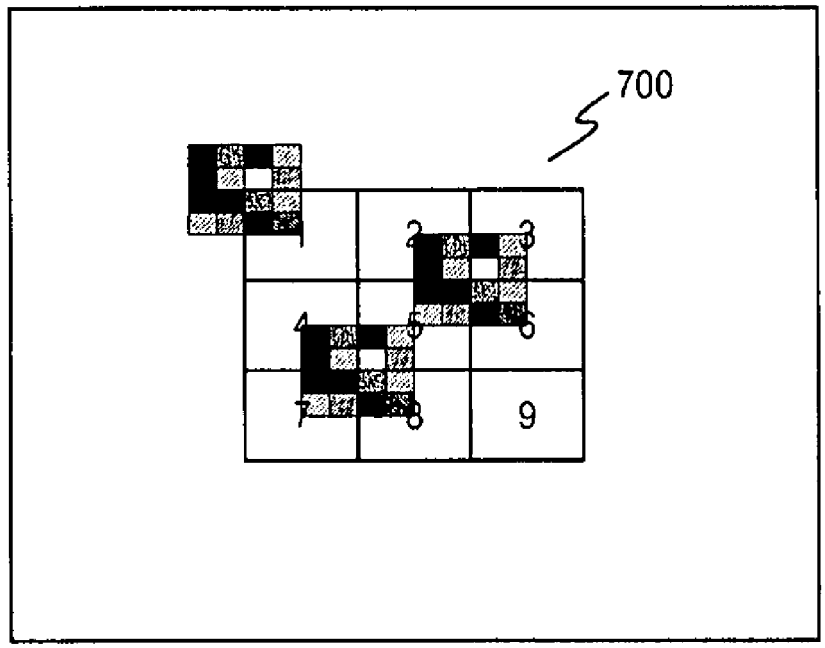
FIGS. 9A and 9B are views showing crosstalk with respect to the first page, and combinations of pixel crosstalk of individual pixels, respectively, according to example embodiments of the present invention.
Figure 9B:
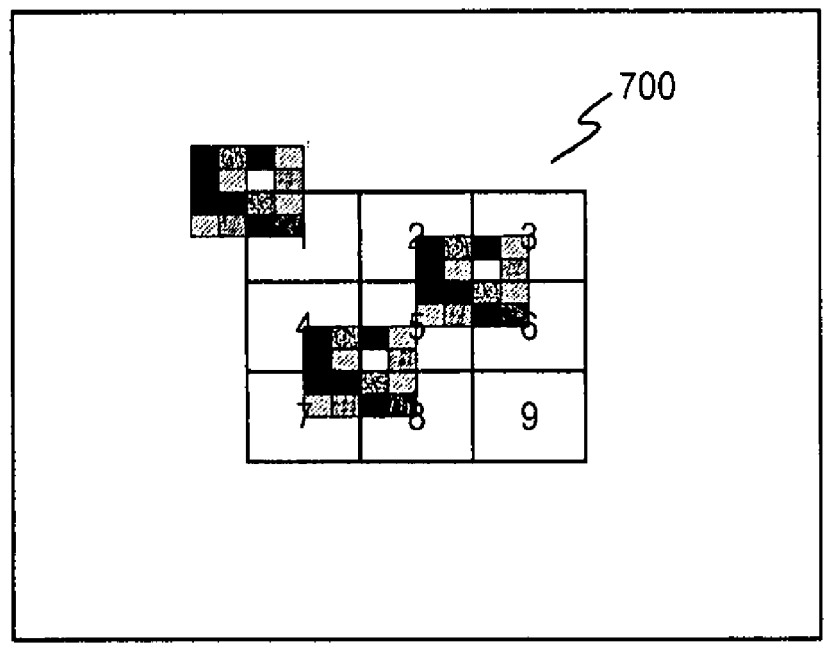

FIG. 9A is a view showing crosstalk in the case where the first page 700 recorded at a first angle is reproduced at the second angle according to an example embodiment of the present invention. FIG. 9B is a view showing combinations of pixel crosstalk caused by the individual pixels of the first page 700 according to an example embodiment of the present invention. Both FIG. 9A and FIG. 9B are almost the same. In actuality, page crosstalk with respect to an entire page is changed when information of the page is changed, and thus it is difficult to express crosstalk numerically and then to remove the crosstalk from a signal. However, according to an example embodiment of the present invention, since the crosstalk value of the entire page can be obtained using crosstalk information of every on-pixel, even if information of the page is changed, a crosstalk value corresponding to changed information can be obtained.

As illustrated in FIGS. 6B and 7B, since the pixel crosstalk occurs not far from a corresponding pixel, crosstalk information may consider influence on only some pixels around the corresponding pixel. In addition, similar crosstalk occurs at adjacent pixels on a page. Accordingly, crosstalk information with respect to a predetermined region of a page is set to one value, so that the amount of information required can be reduced.

Figure 10A:
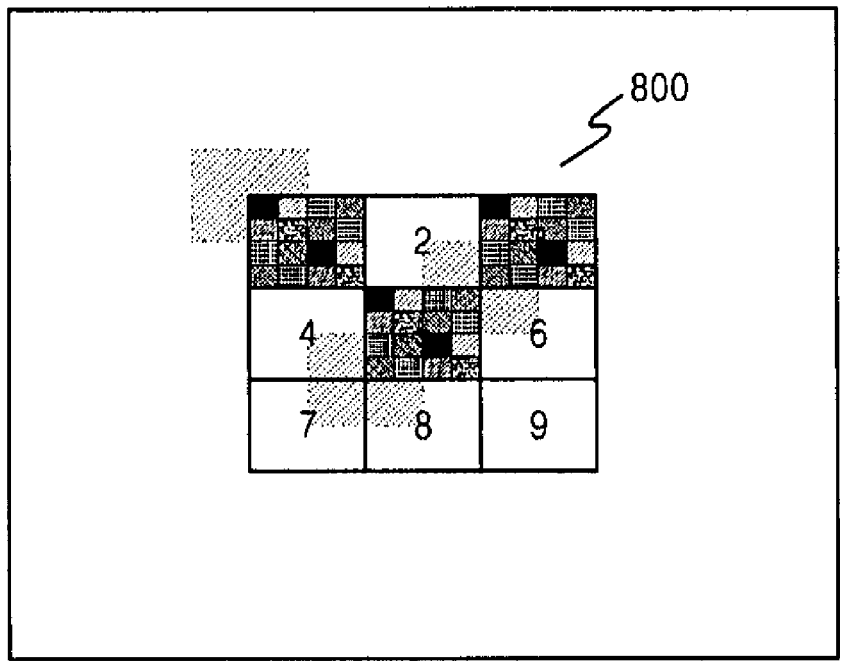
FIGS. 10A and 10B are views showing before and after crosstalk removal with respect to the second page, respectively, according to example embodiments of the present invention.
Figure 10B:
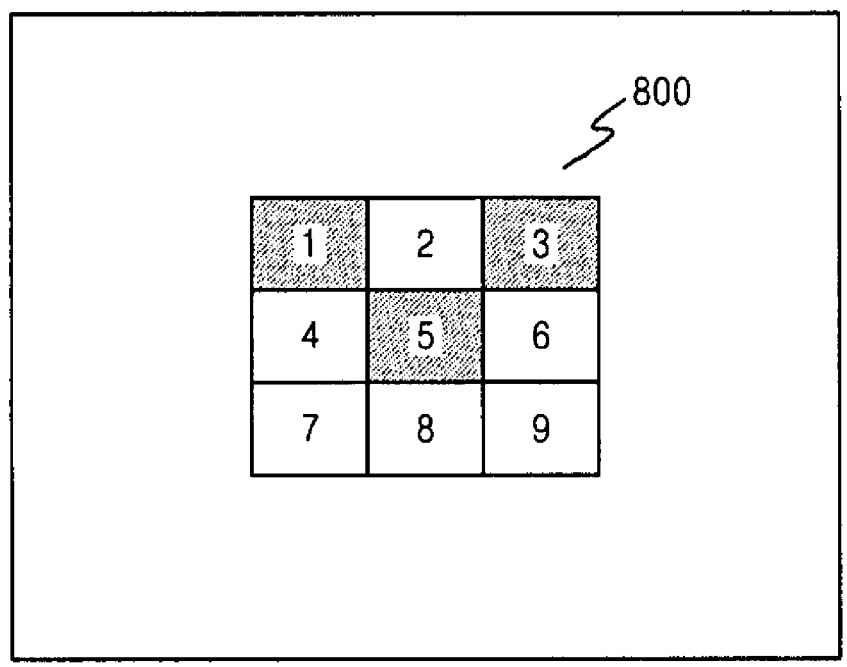

FIGS. 10A and 10B are views showing before and after crosstalk removal of a second page 800, respectively, according to an example embodiment of the present invention. In actuality, when the second page 800 is reproduced, an image as shown in FIG. 10A can be obtained. However, an image as illustrated in FIG. 10B can be obtained by removing crosstalk from the image according to the method of obtaining crosstalk information according to an embodiment of the present invention.

As an example of a technique for experimentally obtaining a pixel crosstalk value caused by each pixel, a specific reference image is recorded in a predetermined region of a holographic storage medium and the recorded reference image may be reproduced at a reproduction angle for reproducing the next page. Of course, the next page recorded at the reproduction angle may not exist. In addition, recording of the reference image may be made with a long interval, so that no crosstalk occurs due to another page. When the reference image is reproduced in the aforementioned manner, on-pixel crosstalk caused by individual on-pixels occurs. If necessary, a plurality of reference pages are recorded so that pixel crosstalk values caused by all pixels can be obtained.

Figure 11A:
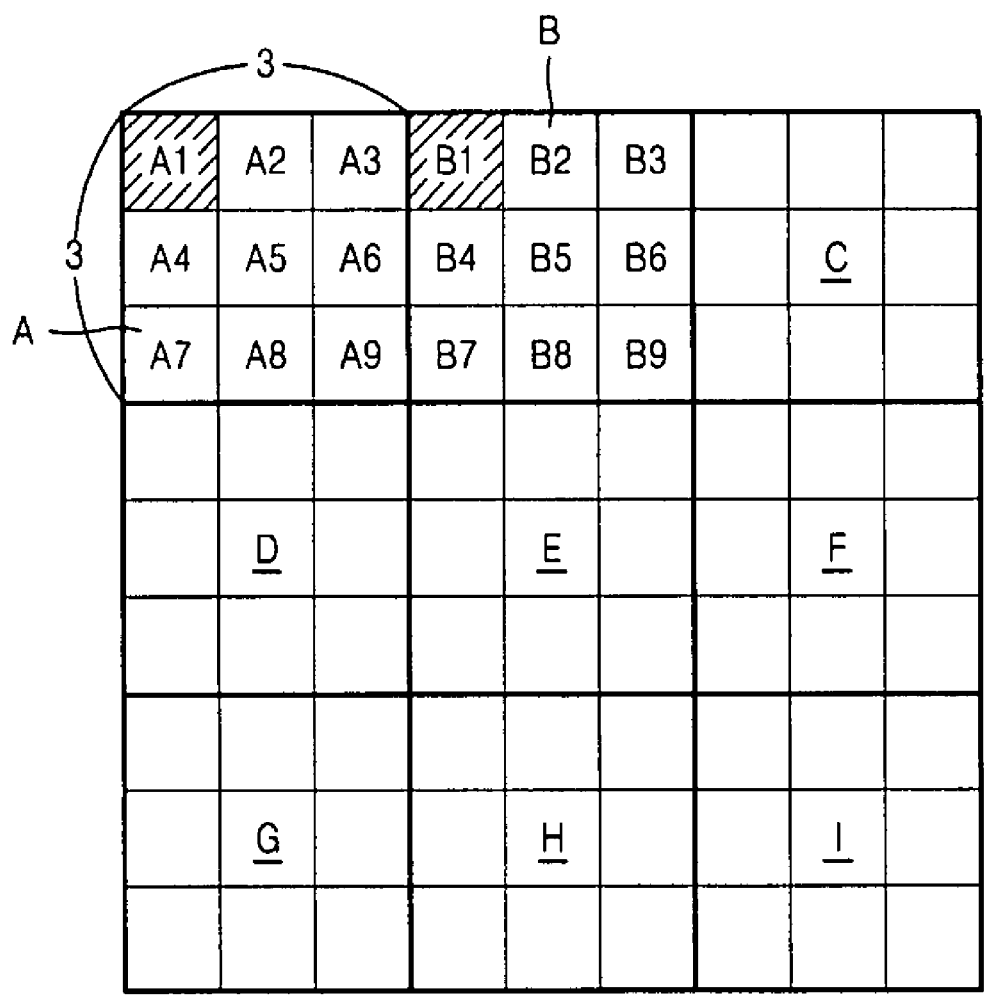
FIGS. 11A and 11B are views for describing a reference image used to obtain crosstalk values of individual pixels, according to example embodiments of the present invention.

For example, referring to FIG. 11A, a page may have 9×9 pixels. For example, a pattern of a reference image may be prepared by setting every 3×3 pixels to one block and setting a plurality of pixels to on-pixels in each block. In the example illustrated in FIG. 11A, one pixel placed at the left uppermost end of each block is set to an on-pixel. On-pixels may be determined based on A1 of block A, B1 of block B, and so forth. In the case of the reference image, the same pixel crosstalk value applies to all the pixels of each block. That is, a pixel crosstalk value obtained with respect to A1 of the block A may also apply to other pixels in the block A.

Figure 11B:
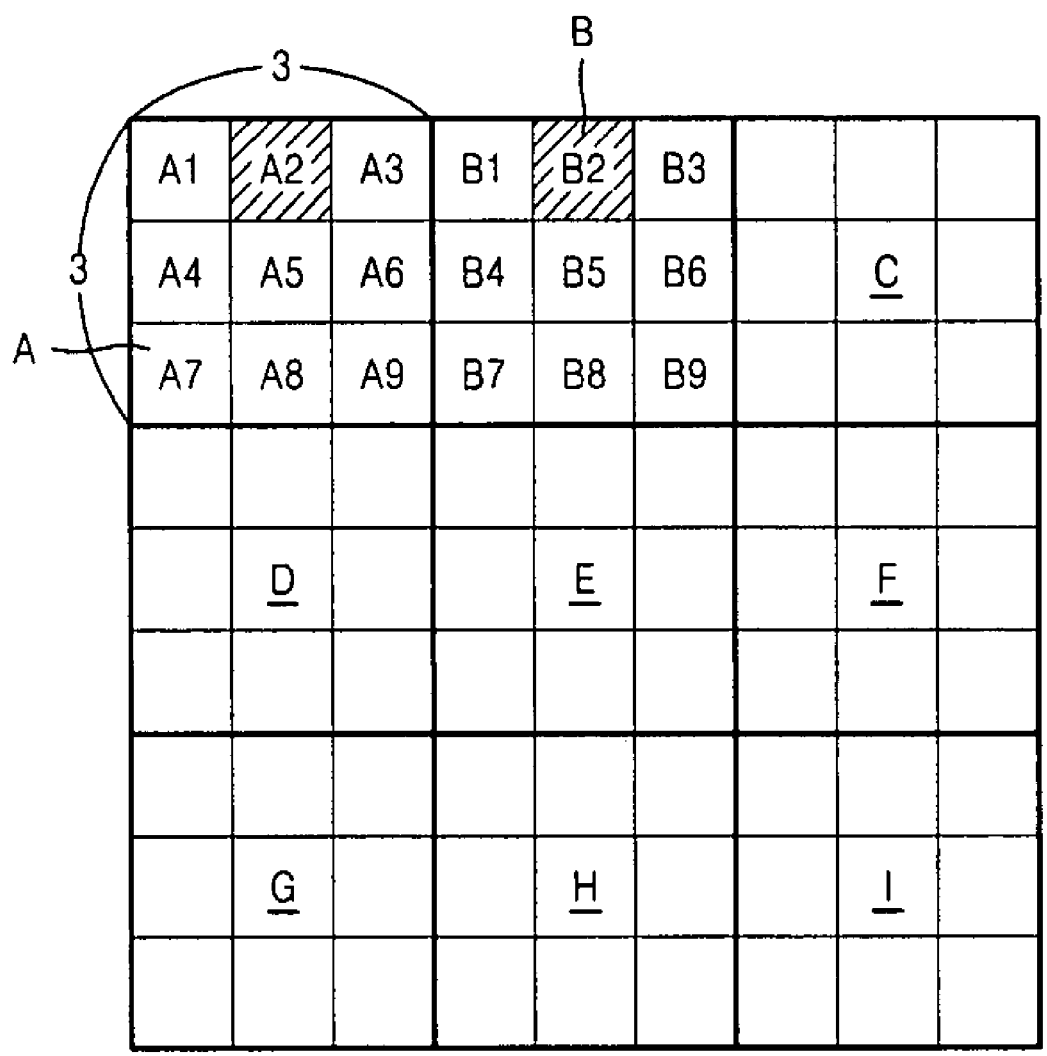

Also, a pixel crosstalk value for respective pixels can be set using a plurality of reference pages and not by applying the same crosstalk value with respect to pixels of each block. Referring to FIG. 11B, a pixel placed at a 1×2 location of each block is set to an on-pixel. That is, a second reference page is recorded in such a manner that A2 of block A, B2 of block B, and so forth, are set to on-pixels, and thereby determining crosstalk values with respect to the pixel A2 of the block A, the pixel B2 of the block B, and so on. In such a manner, pixel crosstalk values with respect to all the pixels of each block are obtained and consequently, pixel crosstalk values with respect to all respective pixels of the page can be obtained.

Figure 12:
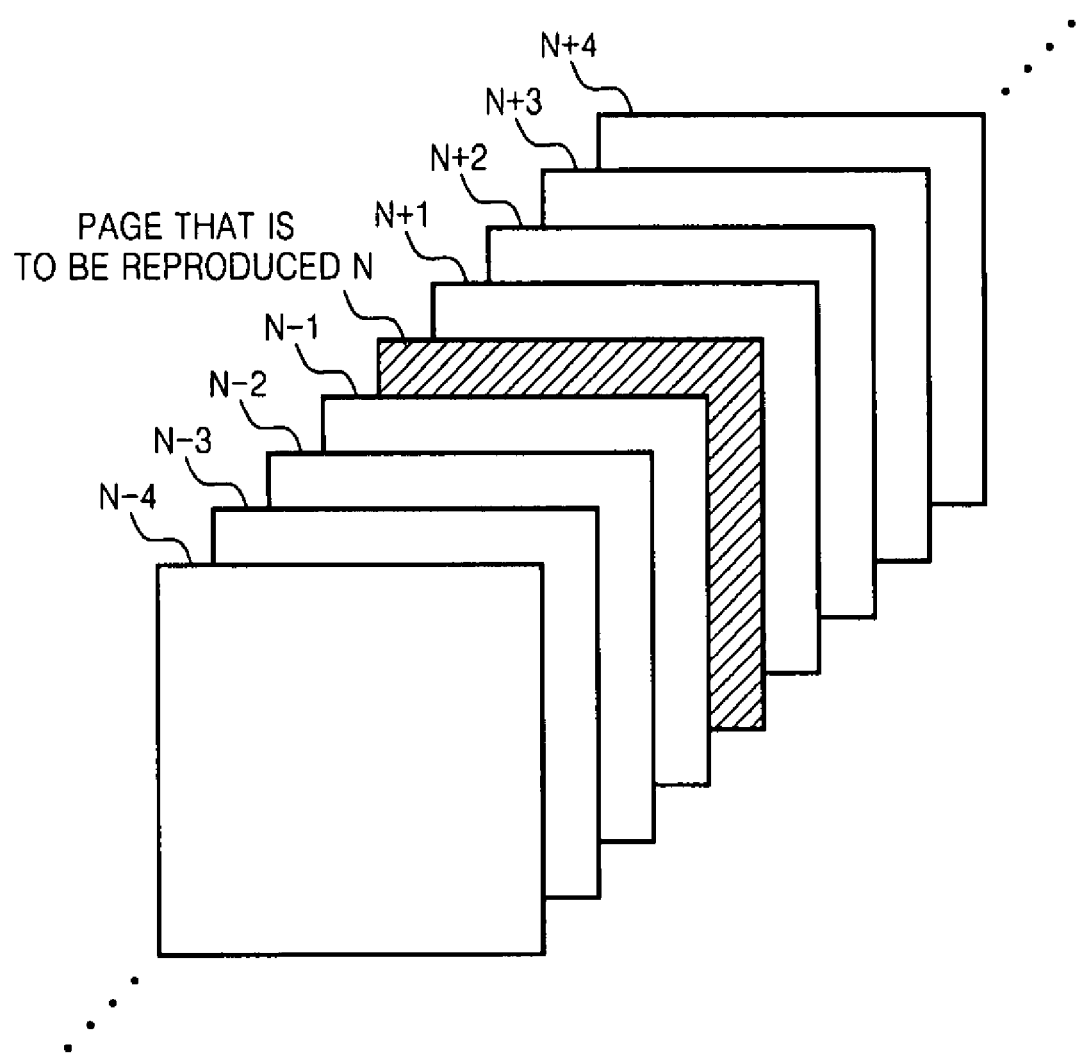
FIG. 12 is a reference view describing adjacent pages used to remove crosstalk according to an example embodiment of the present invention.

FIG. 12 is a reference view describing adjacent pages used to remove crosstalk from a reproduced signal of a page that is to be reproduced, according to an embodiment of the present invention. On the basis of a page N that is to be reproduced, a plurality of preceding adjacent pages N−1, N−2, N−3, N−4, etc., are arranged and a plurality of following adjacent pages N+1, N+2, N+3, N+4, etc., are arranged. In order to remove crosstalk from a reproduced signal of the page N that is to be reproduced, crosstalk caused by at least one of the preceding page N−1 and the following page N+1 may be removed. In addition, crosstalk caused by the plurality of preceding or following pages may be removed.

Figure 13:
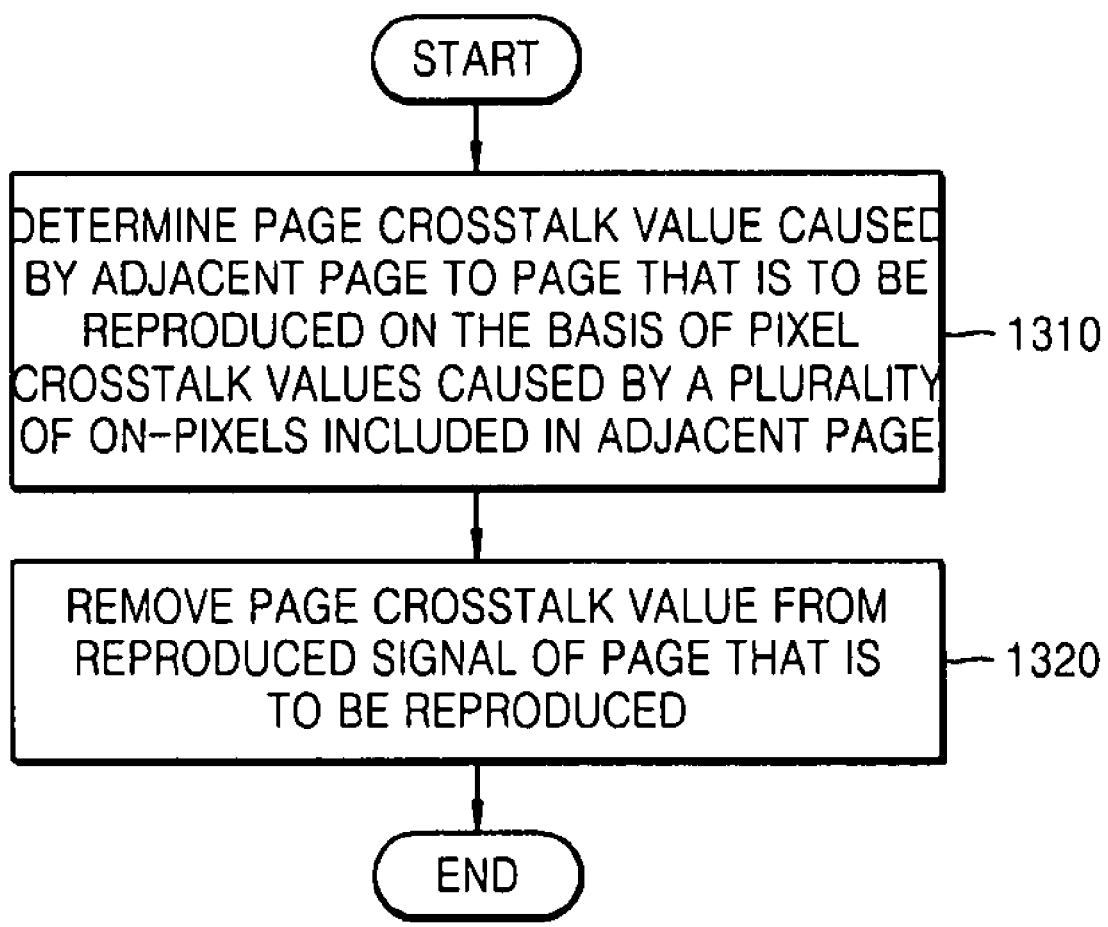
FIG. 13 illustrates a flowchart of a crosstalk removing method according to an example embodiment of the present invention.

FIG. 13 illustrates a flowchart of a technique for removing a crosstalk value from a reproduced signal, according to an example embodiment of the present invention. In block 1310, the controller 500 of the holographic recording and reproduction apparatus illustrated in FIG. 4 determines a page crosstalk value caused by a page adjacent to a page to be reproduced on the basis of an on-pixel crosstalk value caused by at least one on-pixel of the adjacent page. In block 1320, the controller 500 removes the determined page crosstalk value caused by the adjacent page from a reproduced signal of the page to be reproduced.

Figure 14:
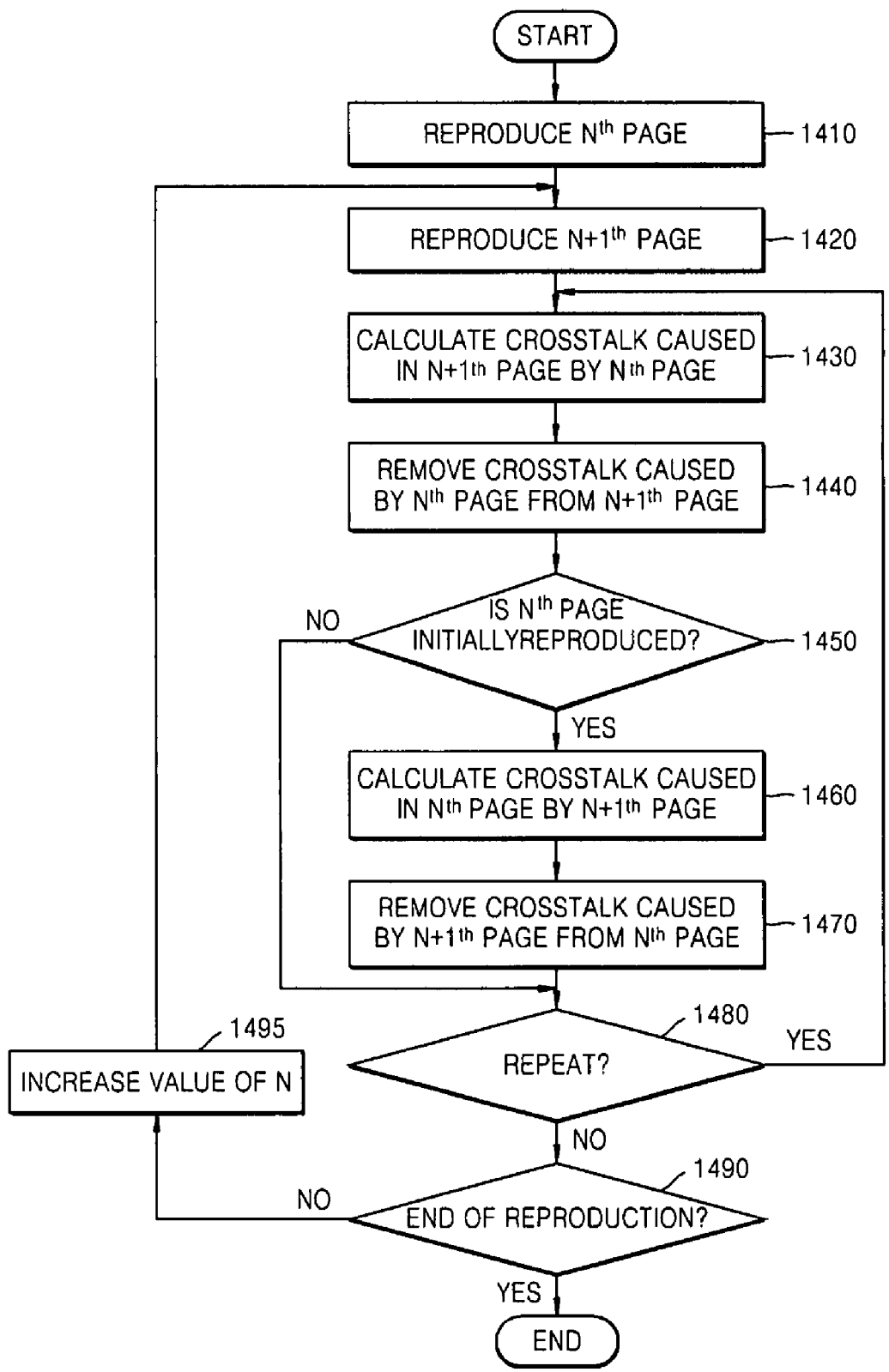
FIG. 14 illustrates a detailed flowchart of the crosstalk removing method of FIG. 13, according to an example embodiment of the present invention.

FIG. 14 illustrates a detailed flowchart of the crosstalk removing technique shown in FIG. 13, according to an example embodiment of the present invention. The optical processor 410 of the holographic recording and reproduction apparatus of FIG. 4 reproduces the $N^{th}$ page from the holographic storage medium 400 under control of the controller 500 in block 1410 and the $N+1^{th}$ page is reproduced in block 1420.

In block 1430, the controller 500 calculates a page crosstalk value caused in the $N+1^{th}$ page by the $N^{th}$ page. In block 1440, the controller 500 removes the page crosstalk value caused by the $N^{th}$ page from a reproduced signal of the $N+1^{th}$ page.

When the $N^{th}$ page is a page that is initially reproduced, signal quality may be lowered since a page crosstalk value in the $N^{th}$ page is not removed. Thus, if the $N^{th}$ page is a page that is initially reproduced in operation 1450, in block 1460 the controller 500 calculates a page crosstalk value caused in the $N^{th}$ page by the $N+1^{th}$ page. In block 1470, the controller 500 removes the page crosstalk value caused by the $N+1^{th}$ page from a reproduced signal of the $N^{th}$ page.

In block 1480, the controller 500 determines whether to repeat the aforementioned process and in block 1490 determines whether reproduction has been completed. If reproduction has not yet been completed, the controller 500 increases the value of N in block 1495 and repeats block 1420.

Figure 15:
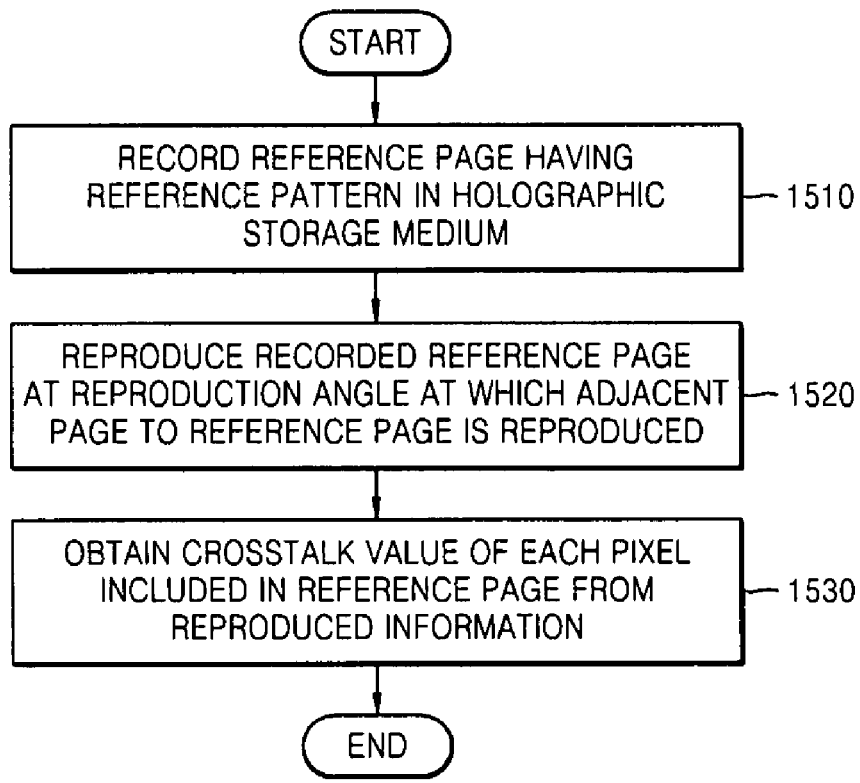
FIG. 15 illustrates a flowchart of a method of obtaining crosstalk information of each pixel, according to an example embodiment of the present invention.

FIG. 15 is a flowchart illustrating a technique for determining pixel crosstalk values of pixels included in a page through an experiment, according to an example embodiment of the present invention. In block 1510, a reference page having a predetermined reference pattern is recorded in a holographic storage medium. In block 1520, the recorded reference page is reproduced at a reproduction angle at which a page adjacent to the reference page is reproduced. In block 1530, a pixel crosstalk value of each pixel included in the reference page is obtained from reproduced information.

Figure 16:
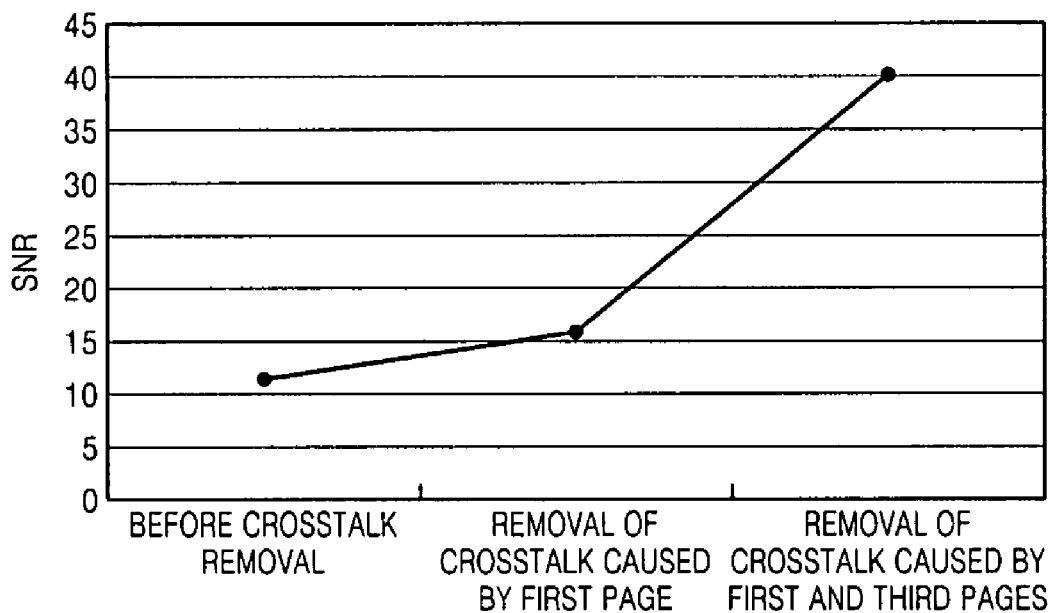
FIG. 16 is a graph illustrating a signal quality improvement effect resulting from removing crosstalk, according to an example embodiment of the present invention.

FIG. 16 is a graph, illustrating a simulation result of a case where reproduction is obtained from a holographic storage medium without removing crosstalk and another case where crosstalk is removed, demonstrating a signal quality improvement effect that can be obtained from example embodiments of the present invention. During the simulation, first through third pages are recorded, the first through third pages are multiplexed at an angular selectivity interval, and the second page is reproduced. When reproduction is initially performed without removing crosstalk, a signal to noise ratio (SNR) is 11.6 dB. When crosstalk of the first page is removed according to an example embodiment, the SNR is 16.1 dB. When crosstalk of both the first and third pages is removed according to another example embodiment, the SNR increases to 40.4 dB.

From the result of FIG. 16, signal quality is improved by removing crosstalk values. Although removing all the crosstalk values is the most effective way to improve the signal quality, improvement of the signal quality is observed even from removing a page crosstalk value caused only by one adjacent page.

Figure 17A:
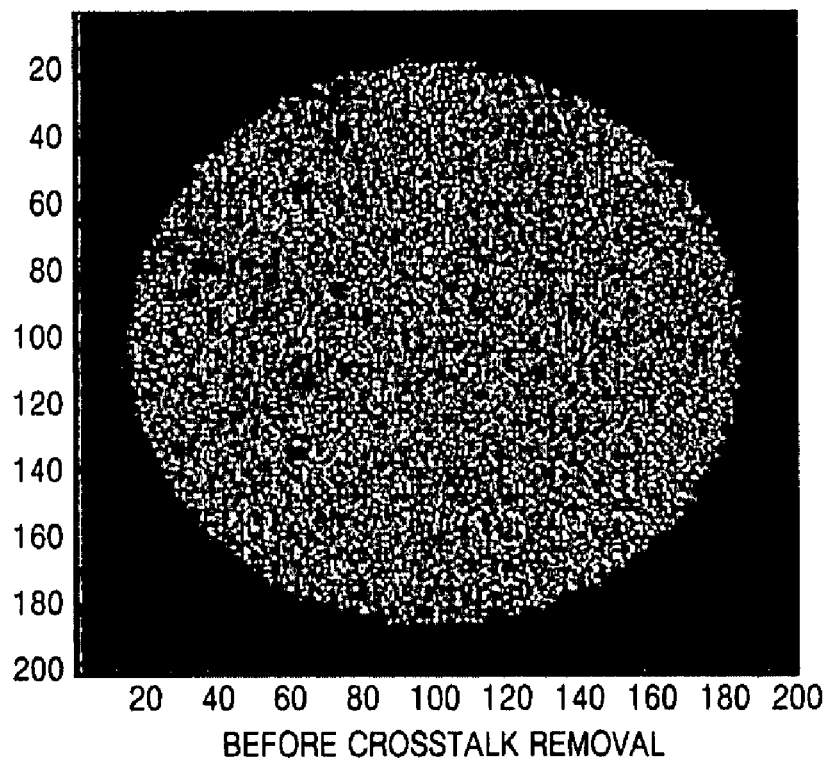
FIGS. 17A and 17B are views illustrating a change in reproduced images before and after removing crosstalk values, according to an example embodiment of the present invention.
Figure 17B:
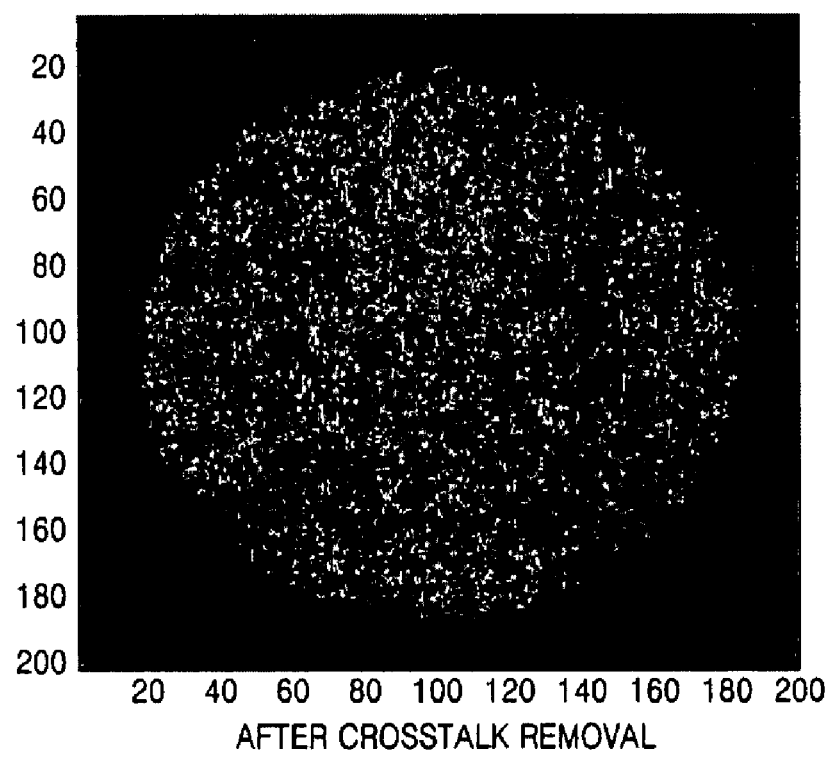

FIGS. 17A and 17B are views illustrating a change in reproduced images before and after removing crosstalk values. As illustrated in FIG. 17A, the signal quality is bad before the crosstalk values are removed. However, as illustrated in 17B, the signal quality is improved after the crosstalk values are removed.

According to an example embodiment of the present invention, an interpage crosstalk value occurring when multiplexing recording in a holographic storage medium is obtained and the obtained interpage crosstalk value is removed from a reproduced signal, thereby improving quality of the reproduced signal.

Aspects of the invention can also be embodied as computer readable codes on a computer readable recording medium. Also, functional programs, codes, and code segments for accomplishing the present invention can be easily construed by programmers skilled in the art to which the present invention pertains. The computer readable recording medium may be any data storage device that can store data which can be thereafter read by a computer system. Examples of computer readable recording media include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. In addition, various components of the holographic recording and reproduction apparatus shown in FIG. 4 can be integrated into a single control unit, or alternatively, can be implemented in software or hardware, such as a field programmable gate array (FPGA) and an application specific integrated circuit (ASIC). As such, it is intended that the processes described herein, including those shown in FIG. 4, be broadly interpreted as being equivalently performed by software, hardware, or a combination thereof. Software modules can be written in a variety of software languages, including C, C++, Java, Visual Basic, and others.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the apparatuses may be arranged as part of a host device, such as a computer, laptop, mobile device, or video game system. Accordingly, it is intended, therefore, that the present invention not be limited to the various example embodiments disclosed, but that the present invention includes all embodiments falling within the scope of the appended claims.

What is claimed is:

1. A method of improving quality of a signal reproduced from a holographic storage medium in which a hologram is recorded by interference between a signal beam and a reference beam, the method comprising:
   determining a page crosstalk value caused by an adjacent page to a page to be reproduced from the holographic storage medium on the basis of on-pixel crosstalk values caused by a plurality of on-pixels of the adjacent page;
   removing the determined page crosstalk value from a reproduced signal of the page to be reproduced;
   in response to the adjacent page being a page that is initially reproduced, determining a page crosstalk value caused by the page to be reproduced on the basis of on-pixel crosstalk values caused by a plurality of on-pixels included in the page to be reproduced;
   removing the page crosstalk value caused by the page to be reproduced from a reproduced signal of the adjacent page; and
   further removing a page crosstalk value from the page to be reproduced using the adjacent page from which the page crosstalk value caused by the page to be reproduced has been removed.

2. An apparatus to improve quality of a signal reproduced from a holographic storage medium in which a hologram is recorded by interference between a signal beam and a reference beam, the apparatus comprising:
   a crosstalk determining unit configured to determine a page crosstalk value caused by an adjacent page to a page to be reproduced from the holographic storage medium on the basis of on-pixel crosstalk values caused by a plurality of on-pixels included in the adjacent page;
   a crosstalk removing unit configured to remove the page crosstalk determined by the crosstalk determining unit from a reproduced signal of the page to be reproduced;
   in response to the adjacent page being a page that is initially reproduced, the crosstalk determining unit is further configured to determine a page crosstalk value caused by the page to be reproduced on the basis of on-pixel crosstalk caused by a plurality of on-pixels included in the page to be reproduced; and
   the crosstalk removing unit is further configured to:
      remove from a reproduced signal of the adjacent page the page crosstalk value caused by the page to be reproduced; and
      further remove a crosstalk value from the page that is to be reproduced using the adjacent page from which the page crosstalk value caused by the page to be reproduced has been removed.

* * * * *